United States Patent
Wang (10) Patent No.: US 7,076,003 B1
(45) Date of Patent: Jul. 11, 2006

(54) CONSTELLATION DESIGN FOR MODEM RECEIVER

(75) Inventor: Zhenyu Wang, Morganville, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/324,304

(22) Filed: Jun. 2, 1999

Related U.S. Application Data (60) Provisional application No. 60/122,596, filed on Mar. 3, 1999.

(51) Int. Cl.
*H04L 25/06* (2006.01)

(52) U.S. Cl. .................................... 375/317

(58) Field of Classification Search ........... 375/224, 375/286, 287, 316, 317, 254, 340, 326, 342, 375/343, 344, 350, 354, 226, 375; 327/24, 327/26, 37
See application file for complete search history.

(56) References Cited

U.S. PATENT DOCUMENTS

| | | | |
|---|---|---|---|
| 4,771,188 A * | 9/1988 | Cheng et al. ............... 327/60 |
| 4,829,194 A * | 5/1989 | LeClaire ................. 250/559.36 |
| 5,012,246 A * | 4/1991 | Chung et al. ............... 341/160 |
| 5,315,405 A * | 5/1994 | Okuwaki ................... 358/445 |
| 5,381,450 A * | 1/1995 | Lane ........................ 375/340 |
| 5,476,488 A * | 12/1995 | Morgan et al. ............. 607/30 |
| 5,621,766 A * | 4/1997 | Bakke et al. ............... 375/340 |
| 5,671,250 A * | 9/1997 | Bremer et al. ............. 375/222 |
| 5,761,251 A * | 6/1998 | Wender ..................... 375/345 |
| 5,861,773 A * | 1/1999 | Meyer ....................... 329/304 |
| 5,880,615 A * | 3/1999 | Bazes ......................... 327/3 |
| 5,898,734 A * | 4/1999 | Nakamura et al. ......... 375/287 |
| 6,049,229 A * | 4/2000 | Manohar et al. .......... 326/115 |
| 6,145,491 A * | 11/2000 | Wilstermann et al. . 123/406.35 |
| 6,178,200 B1 * | 1/2001 | Okunev et al. ............ 375/222 |
| 6,192,146 B1 * | 2/2001 | Abe .......................... 382/165 |
| 6,229,862 B1 * | 5/2001 | Webb ........................ 375/359 |
| 6,281,828 B1 * | 8/2001 | Kimura et al. ............ 341/155 |
| 6,341,358 B1 * | 1/2002 | Bagg et al. .................. 714/43 |
| 6,516,068 B1 * | 2/2003 | Ciurpita et al. ........... 381/106 |
| 6,615,028 B1 * | 9/2003 | Loke et al. .............. 455/127.1 |

* cited by examiner

*Primary Examiner*—Emmanuel Bayard (57) ABSTRACT

A method of forming a constellation design, and a receiver having both a processor that generates the constellation design and having a comparator. The particular constellation design described herein reduces errors resulting from a noisy communication channel. The generated constellation design includes a minimum threshold and a maximum threshold representing a variable range for each of a plurality of possible message levels. The constellation design accounts for the interrelationship between signal strength and noise in the communication channel. The comparator identifies the transmitted message by comparing the received signal with the generated constellation design.

36 Claims, 6 Drawing Sheets

CONSTELLATION DESIGN FOR MODEM RECEIVER

REFERENCE TO RELATED APPLICATIONS

This application claims the benefit of U.S. Provisional Application No. 60/122,596, filed Mar. 3, 1999.

FIELD OF THE INVENTION

This invention relates to improvements in channel modeling and constellation design for modems. Particularly, the invention concerns apparatus and methods for enhancing the operation of a PCM modem receiver.

BACKGROUND OF THE INVENTION

Figure 9:
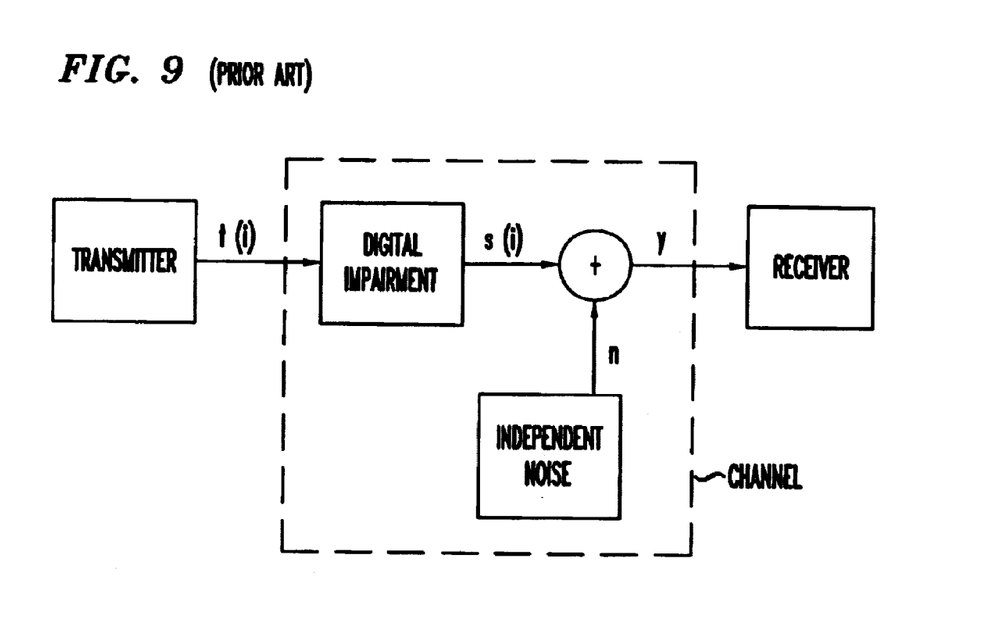
FIG. 9 is a block diagram of a known telecommunication system.

FIG. 9 illustrates elements of a typical communication system. The communication system includes a transmitter, a receiver, and a connecting medium called a channel. The transmitter prepares and sends data down the channel, and the receiver reflects the inverse operations of those in the transmitter in order to recover the transmitted data. In modem design, such as Pulse Code Modulation (i.e. "PCM"), the channel can include noise. For instance, the channel can include digital impairment and an additive independent noise "n". Under all current modem design, the noise is considered independent of the signal transmitted by the transmitter.

The noise n is a continuous random variable with a probability density function $f_n(a)$. As a result, the received random variable Y is also of the continuous type. For a particular observed value, say Y(k), assume that the receiver determines the transmitted message is t(i). Then, the conditional probability of correct detection is just the probability that t(i) was actually transmitted given that Y(k) is observed. According to well known probability theory, the decision rule is to set the receiver output to t(i) if and only if:

$$P[t(i)/Y=Y(k)]=\max_n\{P[t(n)/Y=Y(k)]\} \text{ for all } n.$$

Thus, the optimum receiver is a probability processor. The optimum receiver computes the a posteriori probability given Y=Y(k) for all messages in the set and decides on the message with the largest computed a posteriori probability.

Further communication theory has demonstrated that functionality of the probability processor can be simplified for channels with arbitrary signal and noise statistics. In particular, receivers in the prior art assume that noise is independent of the signal characteristics. Under these circumstances, known receivers are designed according to a minimum distance criteria. In other words, the receiver decides on the message t(i) whose voltage level is closest to the received voltage level Y; this is referred to as minimum distance decoding.

Figure 10:
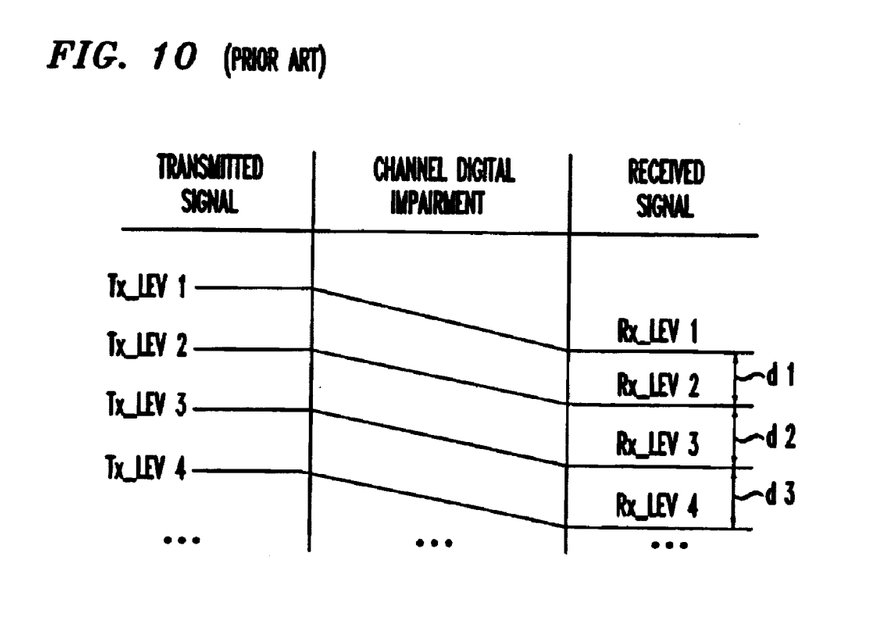
FIG. 10 illustrates a known minimum distance criteria.

FIG. 10 illustrates the minimum distance criteria as typically implemented. The transmitted signal levels are shown on the left, the received signal levels are shown on the right, and the digital impairment is shown between the transmitted and received signal levels. Under this deterministic communication system, each transmitted level is mapped onto a received signal level by the receiver. Received signal voltages that don't exactly line-up with a received signal level are mapped onto the closest signal level under minimum distance decoding.

Figure 11:
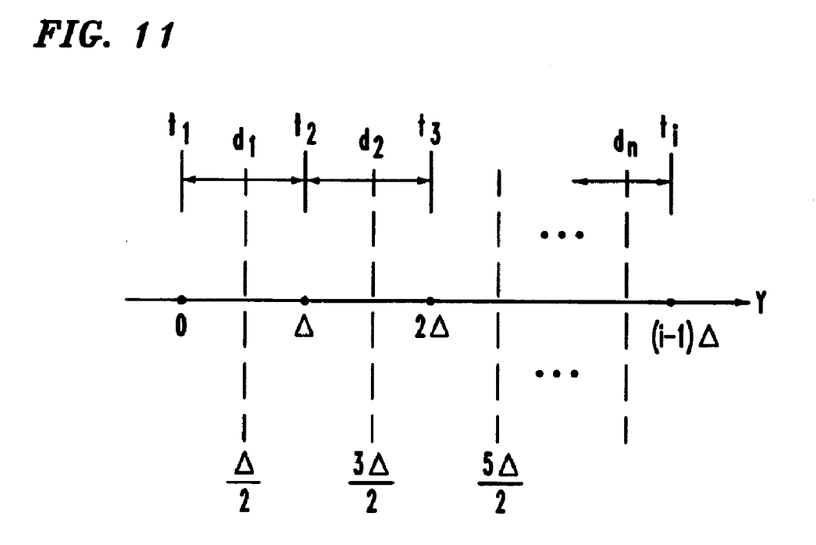
FIG. 11 shows the constellation design for a known minimum distance criteria receiver.

FIG. 11 further illustrates an exemplary constellation design for a receiver using minimum distance decoding. When a communication system transmits "i" equally likely messages, the received voltage when the $i^{th}$ message is transmitted is Y=s(i)+n. Under minimum distance decoding the receiver chooses a message t(i) whose voltage level is closest to the received voltage level Y. Hence, if Y is less than $\Delta/2$ then the receiver decides t1; if $\Delta/2<Y<3\Delta/2$ then the receiver decides t2; if $3\Delta/2<Y<5\Delta/2$ then the receiver decides t3, etc. As illustrated by this example, the known constellation designs in a receiver include a constant range for each possible message level. With particular reference to minimum distance decoding, each possible message level has a constant range $\Delta$.

Figure 12:
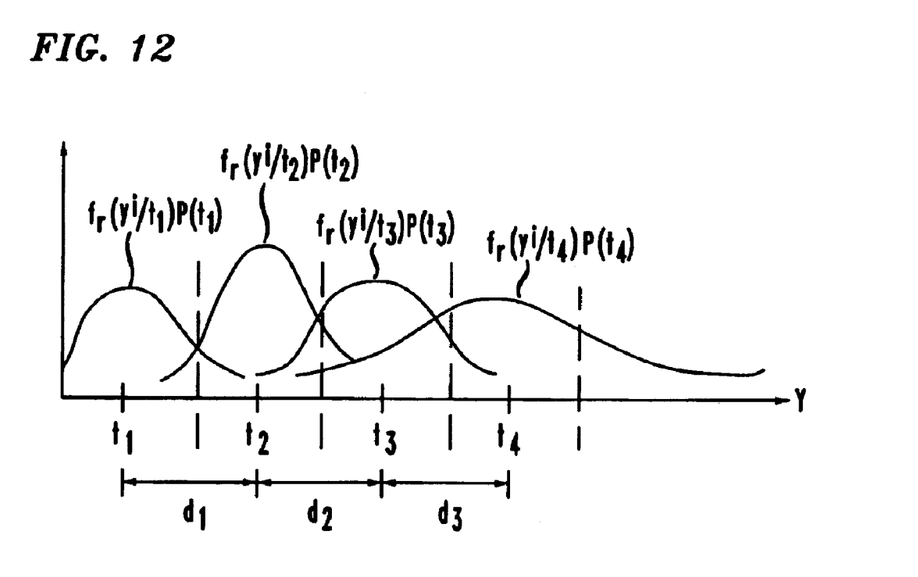
FIG. 12 shows a probability density function for a known receiver.

FIG. 12 shows an example of the conditional probability density functions (i.e. "pdf") for the different transmitted messages t1–t4. The probability density functions for each message do not end at the boundaries between messages t1–t4, rather the pdfs overlap. The overlapping of the pdfs gives rise to errors in the minimum distance decoding receiver of FIG. 11. In particular, a receiver can decide that message t3 was transmitted when message t4 was actually transmitted. These errors in the minimum distance decoding receiver can arise because current models assume that noise in the channel is independent of signal strength.

Accordingly, there is a need for a receiver that accounts for the interrelationship between noise in the channel and the transmitted signal.

SUMMARY OF THE INVENTION

Errors in the receiver may be reduced, according to the invention, with a receiver having a processor that generates a set of thresholds and having a comparator. The processor generates a minimum threshold and a maximum threshold representing a variable range for each of a plurality of possible message levels. The comparator identifies the message by comparing the received signal with the generated minimum and maximum thresholds.

Another embodiment of the invention provides for a method of forming a constellation design having a predetermined number of "i" message levels. The constellation design forms part of a receiver that identifies a transmitted message based upon a received signal. The inventive method includes determining a minimum threshold and a maximum threshold that represent a variable range for each of a plurality of possible signal levels, and calculating a distance d(i) between possible signal levels. The calculated distance d(i) is based upon the determined minimum and maximum thresholds.

The invention also provides for a method of identifying a message based upon a received signal. The method includes steps of receiving the signal, generating thresholds, and identifying the message by comparing the received signal with the generated thresholds. The generated thresholds include a minimum threshold and a maximum threshold that represent a variable range for each of a plurality of possible message levels.

BRIEF DESCRIPTION OF THE DRAWING

The features and advantages of the invention will be apparent from the following description, as illustrated in the accompanying Figures in which like reference characters refer to the same elements throughout the different views.

DETAILED DESCRIPTION

Figure 1:
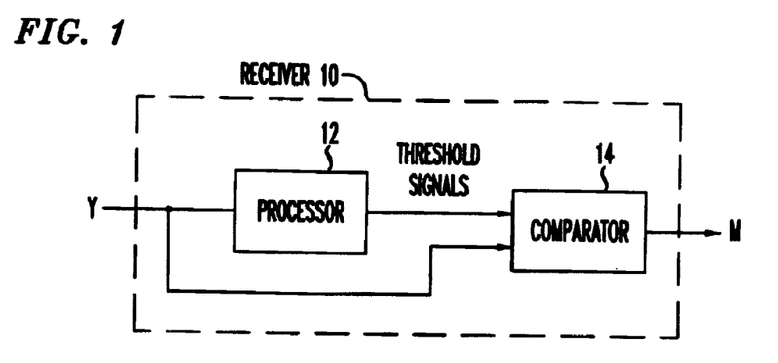
FIG. 1 is block diagram of a receiver in accordance with the invention.
Figure 2:
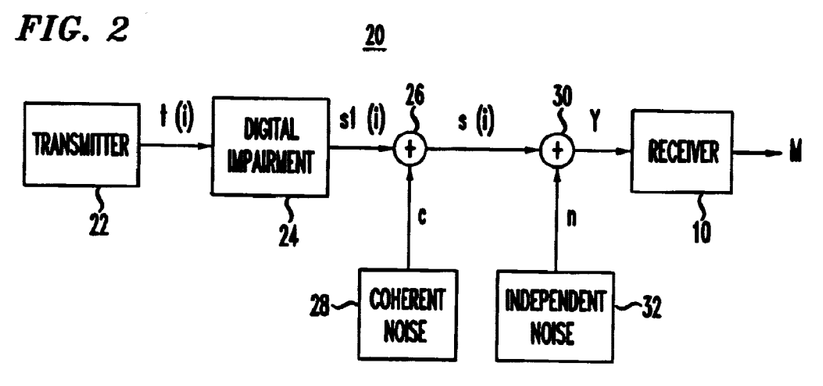
FIG. 2 is a block diagram of a communication system incorporating the receiver of FIG. 1.
Figure 6:
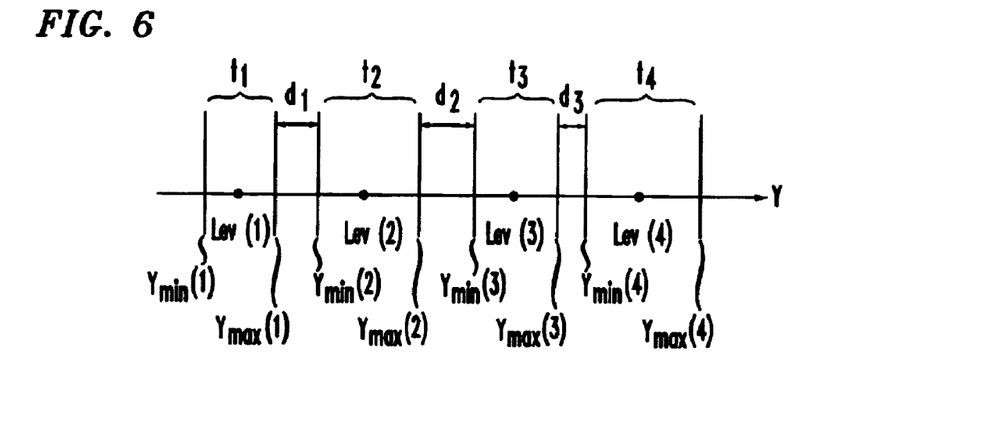
FIG. 6 graphically illustrates the constellation design of the receiver of FIG. 1.

FIG. 1 is a block diagram of a receiver 10 for identifying a transmitted message. FIG. 2 illustrates that the receiver 10 can be part of a communication system 20, such that the receiver 10 can identify a transmitted message t(i) based upon a received signal Y. As further shown in FIG. 1, the receiver 10 includes a processor 12 and a comparator 14. The processor 12 generates a minimum threshold and a maximum threshold that form part of a constellation design. FIG. 6 shows a constellation design formed by the processor 12 of FIG. 1. The illustrated constellation design includes a minimum threshold Ymin(i) and a maximum threshold Ymax(i). The minimum and maximum thresholds represent a variable range for each of a plurality of possible message levels. The comparator 14 identifies the transmitted message by comparing the received signal Y with the generated minimum and maximum threshold signals from the processor 12.

With further reference to FIG. 1, the processor 12 receives signal Y as an input and generates the threshold signals. Further details on generation of the constellation design and the threshold signals are described hereinafter. The threshold signals are received by comparator 14. Comparator 14 then determines, based upon the threshold signals and the received signal Y, the best estimate for the transmitted signal t(i). For example, comparator 14 identifies where the received signal Y lies along the x-axis of FIG. 6, relative to the decision regions t1–t4. Once a decision region is identified, the comparator outputs the signal M based upon the decision region identified. Signal M represents the receiver's best estimate for the transmitted signal.

Processor 12 and comparator 14 can both be formed using electronic circuitry, software instructions executed on a processor, or a combination of circuitry and software. In another aspect of the invention, processor 12 and comparator 14 can be an integral processing block. Particularly, the functions of processor 12 and comparator 14 can be performed by a digital signal processor or micro-processor executing software instructions.

FIG. 2 shows a block diagram of a new communication system 20 incorporating the receiver 10 of FIG. 1. In comparison, a block diagram of a known communication system is illustrated in FIG. 9. The prior art communication system assumes that noise is independent from the transmitted signal. However, the inventors have discovered that noise is not independent from signal, rather some noise is interrelated with the signal strength being transmitted. From this it follows that different signal levels have different noise properties. This concept is illustrated in FIG. 2.

In particular, communication system 20 includes a transmitter 22, a digital impairment block 24, a first summer 26, a coherent noise block 28, a second summer 30, an independent noise block 32, and the receiver 10. The digital impairment block receives the transmitted signal t(i) from the transmitter 22. The first summer 26, then sums the output signal s1(i) from the digital impairment block with the output from the coherent noise block, to form the signal s(i). The second summer then sums the signal s(i) with the output signal n from the independent noise block 32, to generate the signal Y. The receiver 10 generates the output signal M in response to the received signal Y.

The inventor's research demonstrated that the digital impairment block 24 is a non-linear re-mapping that is dependent on the transmitted signal level. Coherent noise block 28 is typically Gaussian random noise caused by the CODEC operation or quantization of the transmitted signal t(i). The inventor's research has also shown that the coherent noise block has a variance that is dependent upon the transmitted signal level t(i). Accordingly, the received signal Y is a random Gaussian process that is dependent upon the transmitted signal level. Since the received signal Y is a random process, the received signal is not a deterministic function as conventional channel modeling teaches.

Figure 3:
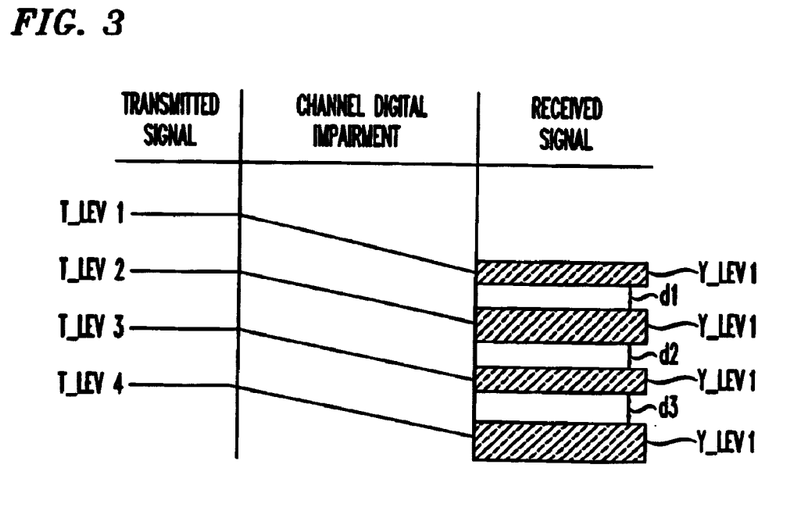
FIG. 3 illustrates the distribution function of the received data y(i) of FIG. 2.

FIG. 3 is an exemplary bar chart showing the distribution function of the received data Y of FIG. 2. The left side of FIG. 3 shows four different transmitted signals, the right side of FIG. 3 shows four different received signals, and a channel is illustrated between the transmitted and received signals. The figure illustrates that the received signal is not deterministic data. Rather, the received signal Y is random data with a particular distribution function. The distance between signal levels, identified as d1, d2 and d3, also varies. Accordingly, a probability function is preferably used to express the event that the received signal equals a particular message level, and a probabilistic function is preferably used to express the distance between message levels. In comparison, as shown in FIG. 10, conventional channel modeling teaches that the received signal levels and the distance between signal levels are deterministic. Conventional channel modeling does not teach that the received signal level is best represented by a range of values and that the range of values for each particular signal level may vary.

Figure 4:
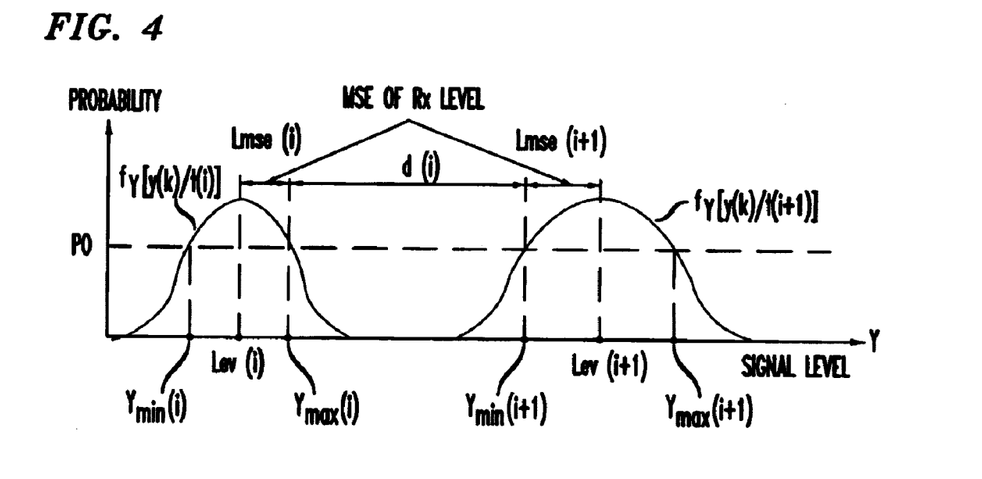
FIG. 4 shows an exemplary set of probability density functions utilized by the receiver of FIG. 1.

FIG. 4 shows an exemplary probability density function for Y as utilized by the receiver 10 of FIG. 1. FIG. 4 illustrates that the received signal Y is randomly distributed data. The received signal data is divided into two curves, one labeled $f_Y[y(k)/t(i)]$ and another labeled $f_Y[y(k)/t(i+1)]$. The curve labeled $f_Y[y(k)/t(i)]$ represents the probability that message y(k) was received given that t(i) was transmitted, and the curve labeled $f_Y[y(k)/t(i+1)]$ represents the probability that message y(k) was received given that t(i+1) was transmitted.

The curves of FIG. 4 also illustrate the definitions of the minimum threshold Ymin, the maximum threshold Ymax, Lmse(i), distance d(i), and Lev(i).

In particular for an $i^{th}$ PCM level, Ymin(i) represents the minimum threshold of a range of received values that cause the receiver 10 to estimate that message t(i) was transmitted. Ymax(i) represents the maximum threshold of a range of values that cause the receiver 10 to estimate that message t(i) was transmitted. Together, Ymin(i) and Ymax(i) form a range of values representing that message t(i) was transmitted.

The "i+1" PCM level has a distinct set of minimum and maximum thresholds, Ymin(i+1) and Ymax(i+1). Ymin(i+1) and Ymax(i+1) form a range of values that cause the receiver 10 to estimate that message t(i+1) was transmitted. The range of values formed by Ymin(i) and Ymax(i) may differ from the range of values formed by Ymin(i+1) and Ymax(i+1). For example, the numerical value Ymax(i)−Ymin(i) may differ from the numerical value Ymax(i+1)−Ymin(i+1). As discussed above, because of the interrelationship between noise and signal level, the length of the range of values representing a signal level may differ from the length of the range of values representing another selected signal level.

The level mean square error, Lmse(i), is defined for an $i^{th}$ PCM level as follows:

For a given probability threshold P0 (typically P0=95%),

If P [y(k)=t(i)]>=P0 for any Y that is an element of the range Ymin(i) to Ymax(i), Then Lmse(i)=[Ymax(i)−Ymin(i)]/2, for the $i^{th}$ PCM level.

The Lmse(i) represents the acceptable range for each received level. If a received value y(k) is within the Lmse(i) range, then the received value is estimated by the receiver 10 to be the transmitted signal t(i).

Each of the curves associated with an $i^{th}$ PCM level may have different Lmse(i) values. The difference in the Lmse(i) values results from the realization that the noise in the communication system is dependent upon the signal level. In general, the bigger the Lmse(i) value, the stronger the coherent noise.

FIG. 4 also shows a distance d(i) between two PCM levels. The distance d(i) is calculated according to the following equation:

$$d(i)=Lev(i+1)-Lev(i)-Lmse(i+1)-Lmse(i);$$

wherein

Lev(i) is the mean value for the curve $f_Y[y(k)/t(i)]$, and Lev(i+1) is the mean value for the curve $f_Y[y(k)/t(i+1)]$.

Thus, d(i) is counted from edge to edge of the level ranges. The distance d(i) guarantees a safety distance exists between two levels, and that the level dependent noise is not included inside this safety distance. By assuring a safety distance between two levels, the signal to noise ratio of the overall communication system is increased.

Figure 5:
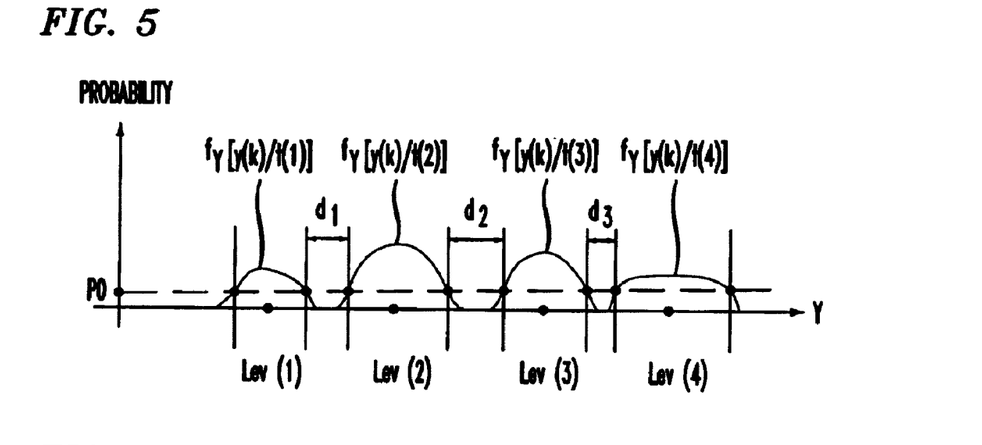
FIG. 5 shows another exemplary set of probability density functions utilized by the receiver of FIG. 1.

FIG. 5 shows another exemplary set of probability density functions utilized by the receiver of FIG. 1. The graph of FIG. 5 shows four sets of curves, labeled $f_Y[y(k)/t(1)]$, $f_Y[y(k)/t(2)]$, $f_Y[y(k)/t(3)]$, and $f_Y[y(k)/t(4)]$. Safety distances separate each of the curves. In particular, safety distance d1 is located between the curves $f_Y[y(k)/t(1)]$ and $f_Y[y(k)/t(2)]$; safety distance d2 is located between the curves $f_Y[y(k)/t(2)]$ and $f_Y[y(k)/t(3)]$; and safety distance d3 is located between the curves $f_Y[y(k)/t(3)]$ and $f_Y[y(k)/t(4)]$. The safety distances d1–d3 are all greater than 0, thereby assuring an effective safety distance between each of the transmitted messages.

FIG. 6 shows a constellation design for the receiver of FIG. 1. The illustrated constellation design is associated with the curves shown in FIG. 5. The constellation design of FIG. 6 illustrates the received signal strength Y along the x-axis, and it also illustrates the decisions made by the receiver 10 along the x-axis. FIG. 6 shows a division of the observed space into four disjoint decision regions t1, t2, t3 and t4. If the received signal Y is an element of t1, then the receiver output signal M is set to t1, that is the receiver 10 decides that t1 was transmitted. Analogously, if the received signal Y is an element of t2, then the receiver output signal M is set to t2, that is the receiver 10 decides that t2 was transmitted. In particular, the receiver 10 estimates that the transmitted message sent was t(i) if the signal strength lies in the decision region t(i).

Each of the illustrated decision regions t1–t4 is based upon the minimum threshold Ymin(i), the maximum threshold Ymax(i), Lmse(i), and Lev(i) parameters. In particular, each of the decision regions t(i) is centered around the corresponding Lev(i) points shown in FIG. 5. The range of distinct length for each decision region t(i) is based upon the corresponding Ymin(i) and Ymax(i) parameters shown in FIGS. 5 and 6. The range of Lmse for each decision region may vary because the noise associated with each received signal can vary.

FIG. 6 also illustrates safety distances d1, d2 and d3 that separate the ranges t1, t2, t3 and t4. The safety distances between decision regions vary. As described above, the safety distance depends upon the Lmse and Lev values of the decision regions surrounding the safety regions. The range of the safety region varies because the noise associated with each received signal can vary.

Figure 7:
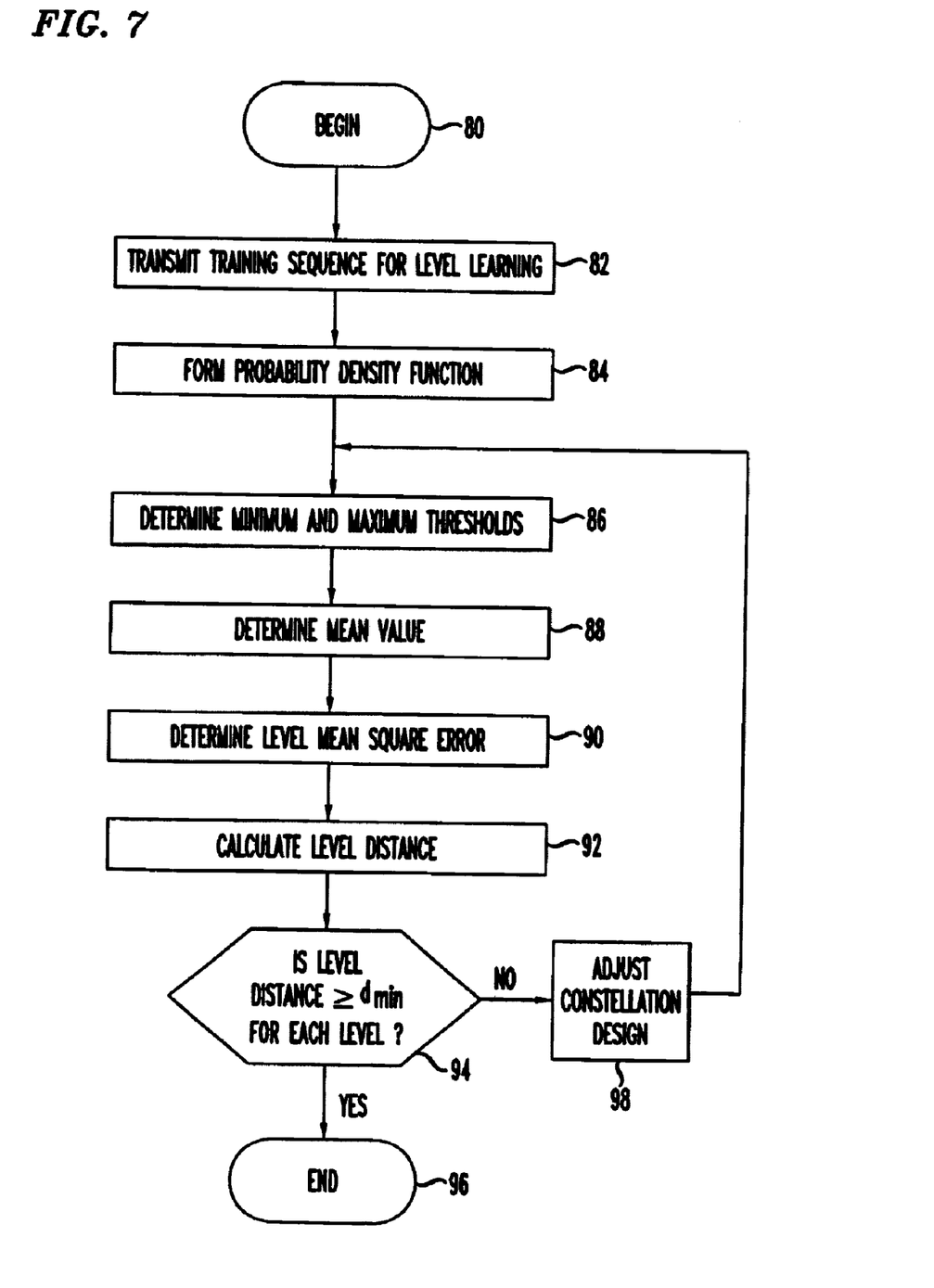
FIG. 7 is a flow chart for generating a constellation design according to the invention.

FIG. 7 is a flow chart for generating a constellation design having a selected number of (i) message levels. The generated constellation design is used by the receiver 10 to identify a transmitted message based upon a received signal. The illustrated flow chart includes the steps of: determining the minimum and the maximum thresholds for each possible received signal level y(k) (Step 86); and calculating the distance d(i) between received signal levels based upon the determined minimum and maximum thresholds (Step 92). The minimum and maximum thresholds represent a variable range for each of a plurality of received signal levels y(k).

The process for generating a constellation design begins at step 80. At step 82, a central site modem transmits a training sequence through the communication channel to the receiver 10 located in a client site modem. At step 84, the transmitted training sequence is used to identify the probability density functions representative of the probability that a signal y(k) is received given that a signal t(i) is transmitted. These conditional probabilities are given the notation: $f_Y[y(k)/t(i)]$. Typically, the training sequence transmitted by the central site modem includes the transmission of L Pulse Code Modulation levels being sent N times, wherein 12<N<100. The client site modem receives the corresponding data L(1), L(2), ... L(N); i.e. the client site modem receives the signal L(i).

At step 86, the minimum and maximum thresholds are determined for each possible received signal level. The thresholds define a range for each possible received signal level wherein the probability of correctly receiving the transmitted message exceeds or equals a selected probability P0.

At step 88, the mean value, Lev(i), is determined for each received signal level, and at step 90 the Lmse(i) is determined for each possible received signal level. The order of steps 88 and 90 can be reversed, that is the Lmse(i) can be calculated before calculating Lev(i).

At step 88, the mean value, Lev(i), is determined for each PCM level. That is each of the curves representing the conditional probabilities $f_Y[y(k)/t(i)]$ is determined. The mean value for each curve is typically calculated using standard mathematical techniques for calculating the mean value of a curve. For instance, Lev(i) can be calculated according to the equation, $$Lev(i) = \frac{1}{N} \sum_{i=1}^{N} L(i);$$

wherein L(i) is the training data received by the client site modem.

Alternatively, if using level learning, the mean value can be obtained by taking the final convergence data from the level learning output.

At step 90, the Lmse is determined based upon the probability density functions calculated in step 84. For each curve representing an $i^{th}$ PCM level, an associated Lmse(i) is calculated. Each Lmse(i) is calculated by estimating, for each curve, the range wherein the probability of correctly receiving a transmitted message exceeds or equals a selected probability P0 (typically, P0=95%).

Alternatively, Lmse can be calculated as follows:
Standard MSE of $$L = \sigma^2 = \frac{1}{N} \sum_{i=1}^{N} [L(i) - Lev(i)]^2,$$

and
Lmse=$\alpha\sigma^2$, where $\alpha$ meets the following equation:

$$P0 = \frac{\int_{-\alpha\sigma^2}^{\alpha\sigma^2} e^{\frac{-x^2}{2\sigma^2}} dx}{\int_{-\infty}^{\infty} e^{\frac{-x^2}{2\sigma^2}} dx},$$

where P0 is a selected probability.

At step 92, the safety distance d(i) between each of the PCM levels is determined. The distance d(i) is calculated according to the following equation:

$d(i)=Lev(i+1)-Lev(i)-Lmse(i+1)-Lmse(i);$ wherein
Lev(i) is the mean value for the curve $f_Y[y(k)/t(i)]$, and
Lev(i+1) is the mean value for the curve $f_Y[y(k)/t(i+1)]$.

At step 94, it is determined whether all the calculated safety distances d(i)>=$d_{min}$. If all the safety distances are >=$d_{min}$, then processing continues to step 96 where the constellation design is completed. If a safety distance d(i) <$d_{min}$, then processing branches to step 98.

At step 98, the constellation design is adjusted to ensure that all safety distances d(i)>=$d_{min}$. Typically, this is achieved by removing an overlapping signal level in the constellation design that gives rise to the inadequate safety distance. By removing the overlapping signal level in the constellation design, the safety distance is increased. For example, if Lev(1) is accepted as a level in the constellation design and d(1)<$d_{min}$, then Lev(2) should be skipped such that the level in the constellation design following Lev(1) is Lev(3). As a result, the new safety distance between Lev(1) and Lev(3) is greater than $d_{min}$. After the safety distance is adjusted, processing returns to step 86.

Figure 8:
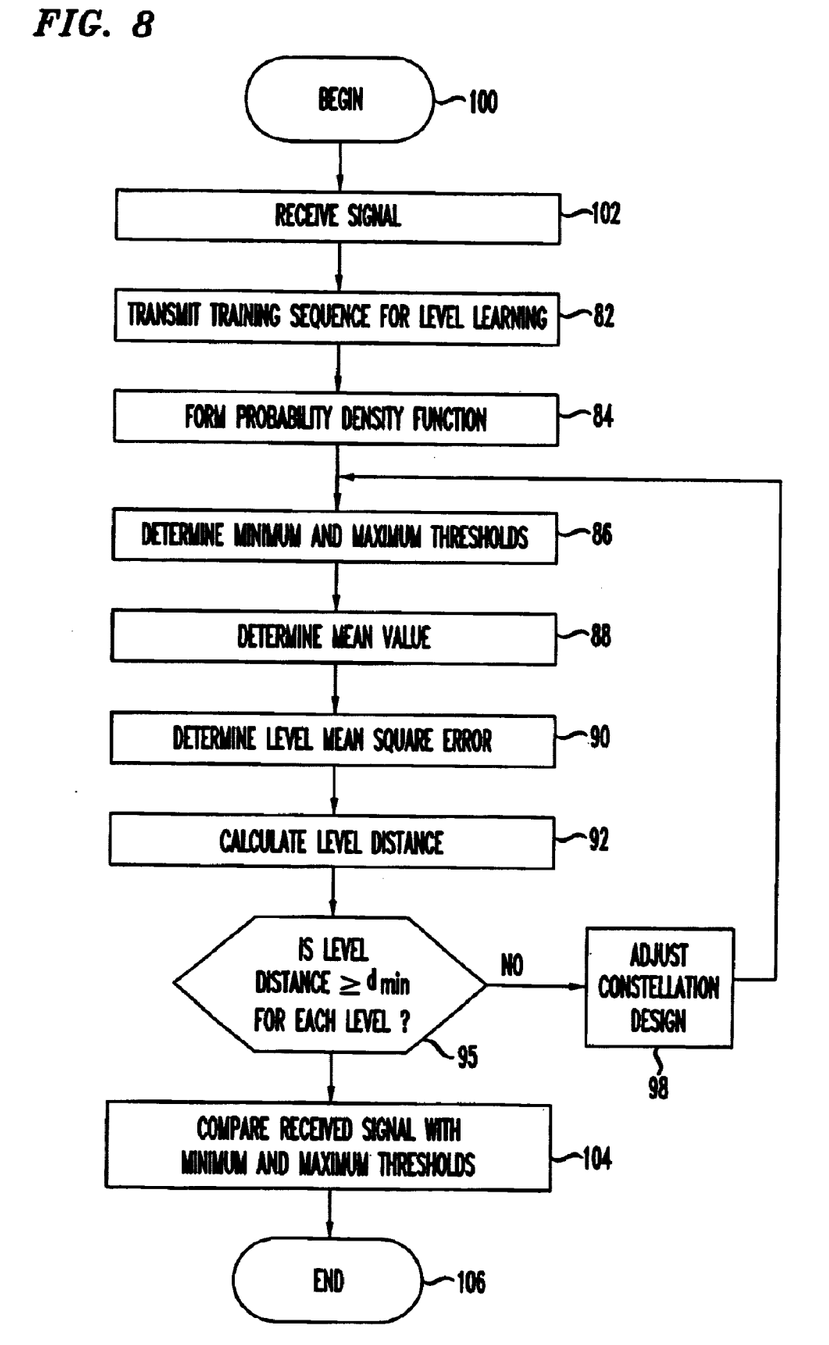
FIG. 8 shows a flow chart for identifying a message based upon a received signal.

FIG. 8 shows a flow chart for identifying a message based upon a received signal. The chart includes the steps of receiving the signal (step 102), generating minimum and maximum thresholds (step 86), and identifying the message by comparing the received signal with the generated minimum and maximum thresholds (step 104). The generated minimum and maximum thresholds represent a variable range for each of a plurality of possible message levels.

The method for identifying a message begins at step 100. At step 102 the receiver 10 receives the transmitted signal. After step 102, the method proceeds to steps 82, 84, 86, 88, 90, and 92. In one alternative embodiment of the invention, step 102 can be performed after step 95 and before step 104. Steps 82–92 are fully described under the description of FIG. 7.

At step 95, it is determined whether all the calculated safety distances d(i)>=$d_{min}$. If all the safety distances are >=$d_{min}$, then processing continues to step 104 where the constellation design is completed. If a safety distance d(i) <$d_{min}$, then processing branches to step 98.

At step 98, the constellation design is adjusted to ensure that all safety distances d(i)>=$d_{min}$. Typically, this is achieved by removing an overlapping signal level in the constellation design that gives rise to the inadequate safety distance. By removing the overlapping signal level in the constellation design, the safety distance is increased. After the safety distance is adjusted, processing returns to step 86.

At step 104, the receiver 10 compares the received signal with the minimum and maximum thresholds. For example, the comparator 14 compares the received signal level with the threshold signals received from the processor (e.g., table) 12. The threshold signals represent the constellation design similar to that illustrated in FIG. 6. By comparing the threshold signals to the received signal the comparator can identify which decision region contains the received signal level. Based on this comparison, the comparator then generates the output signal M. After step 104, the method of identifying the message ends at step 106.

While the invention has been shown and described having reference to specific preferred embodiments, those skilled in the art will recognize that variation in form and detail may be made without departing from the spirit and scope of the invention. Thus, specific details of the disclosure herein are not intended to be necessary limitations on the scope of the invention other than as required by the prior art.

I claim:

1. A receiver for identifying a message based upon a received signal, the receiver comprising:
   a processor that generates a minimum threshold and a maximum threshold representing a range for each of a plurality of possible message levels, and
   a comparator that identifies the message by comparing the received signal with the generated minimum and maximum thresholds, wherein, for each of the possible message levels, the processor is adapted to: (A) determine a respective probability density function having a mean value and a spread; and (B) based on said mean value and said spread, generate the respective minimum threshold and the respective maximum threshold.

2. The receiver according to claim 1, wherein the minimum and maximum thresholds are a function of an interrelationship between noise and the message level.

3. The receiver according to claim 2, wherein the minimum and maximum thresholds are a function of the interrelationship between digital impairment and the message level.

4. The receiver according to claim 2, wherein the minimum and maximum thresholds are a function of the interrelationship between coherent noise and the message level.

5. The receiver according to claim 1, wherein, for each of the possible message levels, the generated minimum and maximum thresholds define a respective range, which has a probability of correctly identifying the respective message that exceeds a selected probability P0.

6. The receiver according to claim 5, wherein the processor includes a means for calculating the respective mean value, Lev(i), for each message level, where i is an index that identifies an i-th message level.

7. The receiver according to claim 6, wherein the processor includes a means for calculating a distance d(i) between the i-th message level and an adjacent (i+1)-th message level, the distance d(i) being calculated according to the equation:

$$d(i)=Lev(i+1)-Lev(i)-Lmse(i+1)-Lmse(i),$$

where Lmse(i) is a mean square error associated with the spread of the probability density function for the i-$^{th}$ message level, Lmse(i+1) is a mean square error associated with the spread of the probability density function for the adjacent message level, and Lev(i+1) is the mean value for the (i+1)-th message level.

8. The receiver according to claim 7, wherein the distance $d(i)>d_{min}$ for all message levels.

9. The receiver according to claim 7, wherein, for at least two message levels, the respective distances d(i) have different values.

10. A method of forming a constellation design having a selected number of message levels, the constellation design forming part of a receiver that identifies a transmitted message based upon a received signal, the method comprising:

determining a minimum threshold and a maximum threshold representing a range for each of a plurality of possible message levels, and calculating distance d(i) between the maximum threshold for an i-th signal level and the minimum threshold for an adjacent (i+1)-th message level, where i is an index that identifies an i-th message level, wherein, for each of the possible message levels, the step of determining comprises: (A) determining a respective probability density function having a mean value and a spread; and (B) based on said mean value and said spread, generating the respective minimum threshold and the respective maximum threshold.

11. The method according to claim 10, wherein the step of determining the minimum threshold and the maximum threshold comprises the steps of:

for each of the possible signal levels, identifying the minimum and maximum thresholds as boundaries of a range, which has a probability of correctly identifying the transmitted message level that exceeds a selected probability P0.

12. The method according to claim 10, further including the step of calculating the distance d(i) in accordance with the equation:

$$d(i)=Lev(i+1)-Lev(i)-Lmse(i+1)-Lmse(i)$$

where Lmse(i) is a mean square error associated with the spread of the probability density function for the i-th message level, Lmse(i+1) is a mean square error associated with the spread of the probability density function for the adjacent message level, Lev(i) is the mean value for the i-th message level, and Lev(i+1) is the mean value for the (i+1)-th message level.

13. The method according to claim 10, further comprising the step of determining whether the calculated distance $d(i)>d_{min}$, wherein $d_{min}$, represents a selected minimum value.

14. The method according to claim 13, further comprising the step of adjusting the constellation design such that the distance $d(i)>d_{min}$, for all received signal levels in the constellation design.

15. The method according to claim 12, further comprising the step of calculating the mean value, Lev(i), according to the equation:

$$Lev(i) = \frac{1}{N}\sum_{k=1}^{N} L(k),$$

where L(k) designates training data points received by the receiver, and

N is the number of times that a training signal corresponding to the i-th message level is sent.

16. The method according to claim 15, further comprising the step of calculating a standard mean square error, $\sigma^2$, according to the equation:

$$\sigma^2 = \frac{1}{N}\sum_{i=1}^{N} [L(i) - Lev(i)]^2.$$

17. The method according to claim 16, further comprising the step of calculating a mean square error for the i-th message level, Lmse(i), according to the equation:

$$Lmse=\alpha\sigma^2,$$

where $\alpha$ is a coefficient parametrically defined by the following equation:

$$P0 = \frac{\int_{-\alpha\sigma^2}^{\alpha\sigma^2} e^{\frac{-x^2}{2\sigma^2}} dx}{\int_{-\infty}^{\infty} e^{\frac{-x^2}{2\sigma^2}} dx},$$

where P0 is a selected probability and x is an integration variable.

18. A method of identifying a message based upon a received signal, the method comprising:

receiving the signal, providing a minimum threshold and a maximum threshold representing a range for each of a plurality of possible message levels, and identifying the message by comparing the received signal with the generated minimum and maximum thresholds, wherein, for each of the possible message levels, the step of providing comprises:

(A) determining a respective probability density function having a mean value and a spread; and (B) based on said mean value and said spread, generating the respective minimum threshold and the respective maximum threshold.

19. The method according to claim 18, wherein the minimum and maximum thresholds are generated as a function of an interrelationship between noise and the message level.

20. The method according to claim 19, wherein the minimum and maximum thresholds are generated as a function of the interrelationship between digital impairment and the message level.

21. The method according to claim 19, wherein the minimum and maximum thresholds are generated as a function of the interrelationship between coherent noise and the message level.

22. The method according to claim 18, wherein, for each of the possible message levels, the respective minimum and maximum thresholds define a range wherein the probability of correctly identifying the respective message exceeds a selected probability P0.

23. The method according to claim 22, including the step of calculating the mean value, Lev(i), where i is an index that identifies an i-th message level.

24. The method according to claim 23, including the step of calculating a distance d(i) according to the equation:

$$d(i)=Lev(i+1)-Lev(i)-Lmse(i+1)-Lmse(i),$$

where Lmse(i) is a mean square error associated with the spread of the probability density function for the i-th message level, Lmse(i+1) is a mean square error associated with the spread of the probability density function for an adjacent (i+1)-th message level, and Lev(i+1) is the mean value for the (i+1)-th message level.

25. The method according to claim 24, wherein, for at least two of the possible message levels, the respective distances d(i) have different values.

26. The method according to claim 24, further comprising the step of determining whether the calculated distance $d(i)>d_{min}$, where $d_{min}$ represents a selected minimum value.

27. The method according to claim 26, further comprising the step of adjusting a constellation design such that the distance $d(i)>d_{min}$ for all message levels in the constellation design.

28. The method according to claim 23, further comprising the step of calculating the mean value, Lev(i), according to the equation:

$$Lev(i) = \frac{1}{N}\sum_{k=1}^{N} L(k),$$

where L(k) designates training data points, and

N is the number of times that a training signal corresponding to the i-th message level is sent.

29. The method according to claim 28, further comprising the step of calculating a standard mean square error, $\sigma^2$ according to the equation:

$$\sigma^2 = \frac{1}{N}\sum_{i=1}^{N} [L(i) - Lev(i)]^2.$$

30. The method according to claim 29, further comprising the step of calculating a mean square error for the i-th message level, Lmse(i), according to the equation:

$$Lmse=\alpha\sigma^2,$$

where $\alpha$ is a coefficient parametrically defined by the following equation:

$$P0 = \frac{\int_{-\alpha\sigma^2}^{\alpha\sigma^2} e^{\frac{-x^2}{2\sigma^2}} dx}{\int_{-\infty}^{\infty} e^{\frac{-x^2}{2\sigma^2}} dx},$$

where P0 is a selected probability and x is an integration variable.

31. A method of forming a constellation design having a selected number of (i) message levels, the constellation design forming part of a receiver that identifies a transmitted message based upon a received signal, the method comprising:
  determining a minimum threshold and a maximum threshold representing a variable range for each of a plurality of possible signal levels in the constellation design, and
  calculating the distance d(i) between possible signal levels based upon the determined minimum and maximum thresholds, including the steps of:
    determining the mean value, Lev(i), for a selected variable range identified by a selected set of minimum and maximum thresholds, and
    calculating the distance d(i) as a function of Lev(i) in accordance with the equation:

$$d(i)=Lev(i+1)-Lev(i)-Lmse(i+1)-Lmse(i);$$

wherein the term "i+1" identifies a message level adjacent the $i^{th}$ message level in the constellation design for the receiver and wherein Lmse(i) is the level mean square error for the $i^{th}$ message level.

32. A method of forming a constellation design having a selected number of message levels, the constellation design forming part of a receiver that identifies a transmitted message based upon a received signal, the method comprising:
  determining a minimum threshold and a maximum threshold representing a range for each of a plurality of possible signal levels;
  calculating the distance d(i) between possible signal levels based upon the determined minimum and maximum thresholds, including the steps of:
    determining the mean value, Lev(i), for a selected variable range identified by a selected set of minimum and maximum thresholds, and
    calculating the distance d(i) as a function of Lev(i);
  identifying whether the calculated distance $d(i)>d_{min}$, wherein $d_{min}$ represents a selected minimum value; and
  adjusting the constellation design, when $d(i) \leq d_{min}$.

33. A method of identifying a message based upon a received signal, the method comprising:
  receiving the signal,
  generating a minimum threshold and a maximum threshold representing a variable range for each of a plurality of possible message levels in a single constellation design, and
  identifying the message by comparing the received signal with the generated minimum and maximum thresholds, wherein the generating step includes the step of calculating a variable range Lmse(i) for each possible message level Y, Lmse(i) representing one-half the distance between the minimum and maximum thresholds for each possible message level, wherein the minimum and maximum thresholds define a range wherein the probability of correctly receiving a selected signal exceeds a selected probability P0.

34. A method of identifying a message based upon a received signal, the method comprising:

receiving the signal, generating a minimum threshold and a maximum threshold representing a variable range for each of a plurality of possible message levels in a single constellation design, identifying the message by comparing the received signal with the generated minimum and maximum thresholds, and determining a distance d(i) between received signal levels, the distance d(i) having different values for a plurality of message levels, including the steps of:

determining the mean value, Lev(i), for a selected variable range identified by a selected set of minimum and maximum thresholds, and calculating the distance d(i) as a function of Lev(i).

35. The method according to claim 32, wherein the step of adjusting comprises removing from the constellation design a message level that gives rise to $d(i) \leq d_{min}$.

36. The method according to claim 32, wherein the sizes of the ranges are different for at least two of the message levels.

* * * * *

UNITED STATES PATENT AND TRADEMARK OFFICE
CERTIFICATE OF CORRECTION

PATENT NO. : 7,076,003 B1  Page 1 of 1
APPLICATION NO. : 09/324304
DATED : July 11, 2006
INVENTOR(S) : Zhenyu Wang It is certified that error appears in the above-identified patent and that said Letters Patent is hereby corrected as shown below:

In column 9, line 18, replace "$i^{th}$" with --i-th--.

Signed and Sealed this

Fourteenth Day of November, 2006

JON W. DUDAS
*Director of the United States Patent and Trademark Office*